Nov. 8, 1955  H. W. RINGERING  2,722,829
WHEEL BALANCER
Filed July 29, 1952  4 Sheets-Sheet 2

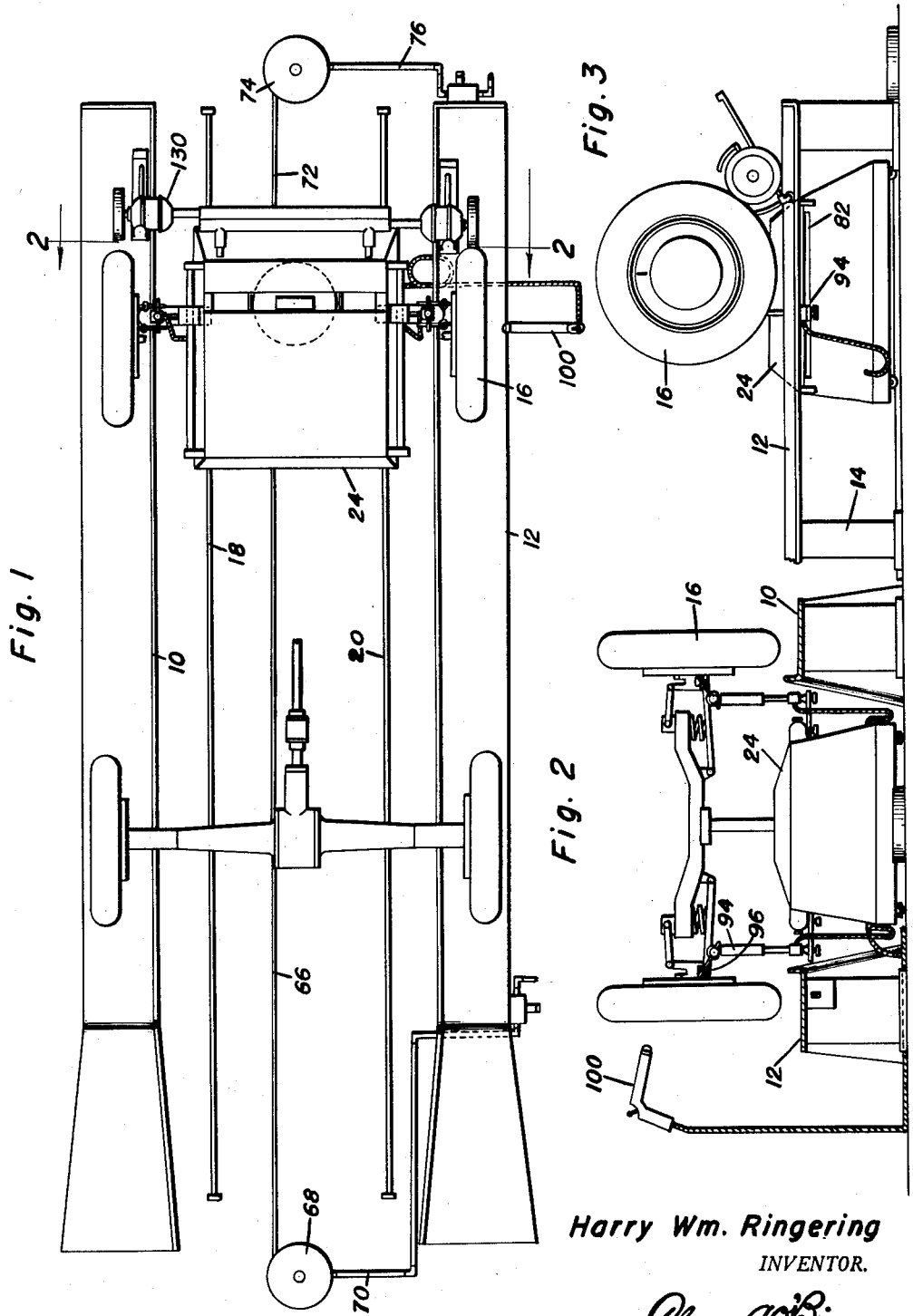
Harry Wm. Ringering
INVENTOR.

Harry Wm. Ringering
INVENTOR.

BY Clarence A O'Brien
and Harvey B. Jacobson
Attorneys

Nov. 8, 1955

H. W. RINGERING 2,722,829

WHEEL BALANCER

Filed July 29, 1952

Harry Wm. Ringering
INVENTOR.

BY *Clarence A. O'Brien*
*and Harvey B. Jacobson*
Attorneys

Nov. 8, 1955  H. W. RINGERING  2,722,829
WHEEL BALANCER

Filed July 29, 1952  4 Sheets-Sheet 4

Harry Wm. Ringering
INVENTOR.

BY Clarence A. O'Brien
and Harvey B. Jacobson
Attorneys

United States Patent Office 2,722,829
Patented Nov. 8, 1955

2,722,829

WHEEL BALANCER

Harry W. Ringering, East Alton, Ill.

Application July 29, 1952, Serial No. 301,496

9 Claims. (Cl. 73—66)

This invention relates to a wheel balancer and particularly to a balancing machine for balancing the wheels of an automotive vehicle when supported on a drive-on service rack.

In the operation of automotive vehicles it is desirable to have the wheels including the entire structure properly balanced so that an automotive vehicle will operate with smoothness. It has heretofore been customary to remove the wheels from the vehicle and balance the wheels per se. However, it has recently been found that better results can be achieved by jacking up the car and balancing the entire wheel in place on the car. The present invention provides a device for easily and accurately balancing wheels while mounted on an automotive vehicle. Devices particularly adapted to be utilized with racks of the so-called drive-on variety in which the automotive vehicle is driven on to runways which are elevated to a suitable height so that the workman may conveniently work on the bottom portions of the vehicle. The balancing equipment is mounted on a carriage which is adapted to be moved longitudinally of the rack so that it may be applied to either the front or the back end of the vehicle and has a lifting jack which may be connected to lift either one or both wheels of either the front or back of the vehicle as is desired. A power device is provided for propelling the carriage in either direction as is desired and tracks are preferably provided so that the carriage is accurately guided with relation to the runways and the vibration pick ups and other equipment mounted on the carriage may be properly located with respect to the automotive vehicle and suitable spinning devices may be provided for spinning the front wheels or any other non-motive driven wheel.

It is accordingly an object of the invention to provide an improved balancing device.

It is a further object of the invention to provide a carriage carrying the various implements for balancing a wheel.

It is another object of the invention to provide means for properly spinning a wheel to determine the vibration therein.

It is a further object of the invention to provide a compact wheel balancing outfit.

Other objects and many of the attendant advantages of the present invention will be apparent from the following detailed description taken in conjunction with the accompanying drawing in which:

Figure 1 is a top plan view of the balancer shown in position with a drive-on rack with the wheels of the automotive vehicle shown in position on the runways of the rack;

Figure 2 is a cross-section of the rack taken substantially on the plane indicated by the line 2—2 of Figure 1 and showing the device with the front end of a vehicle elevated;

Figure 3 is a fragmentary side elevation showing the wheel in operating position;

Figure 4:
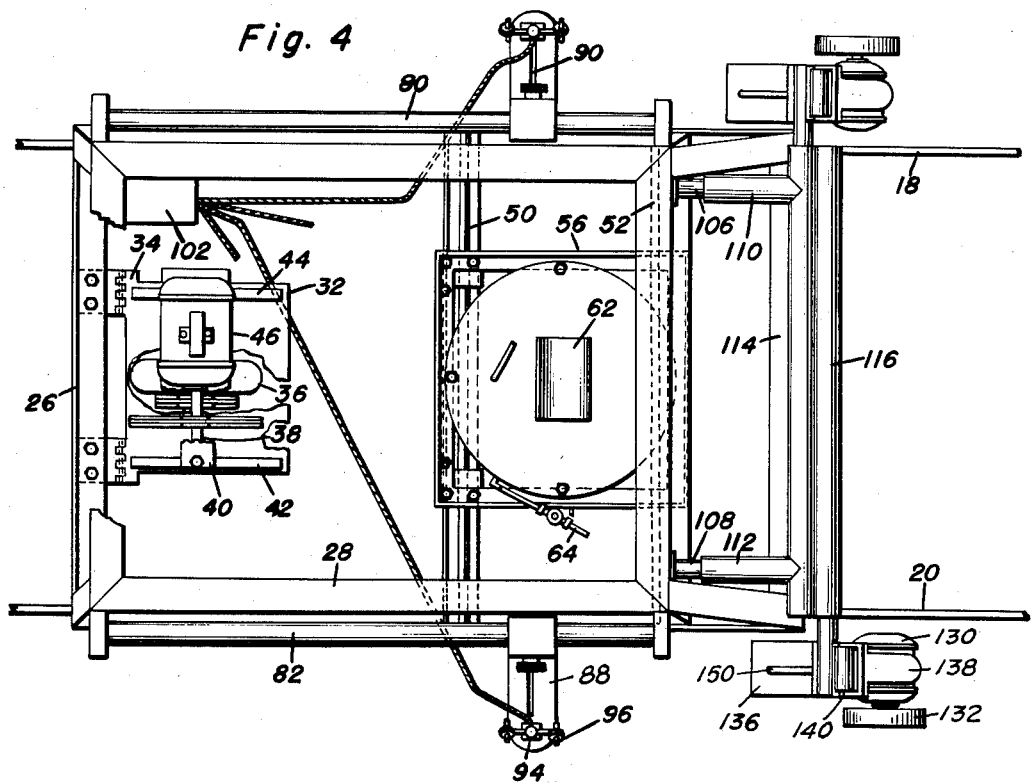
Figure 4 is a top plan view of the carriage and showing the relation of the various portions thereon.
Figure 5:
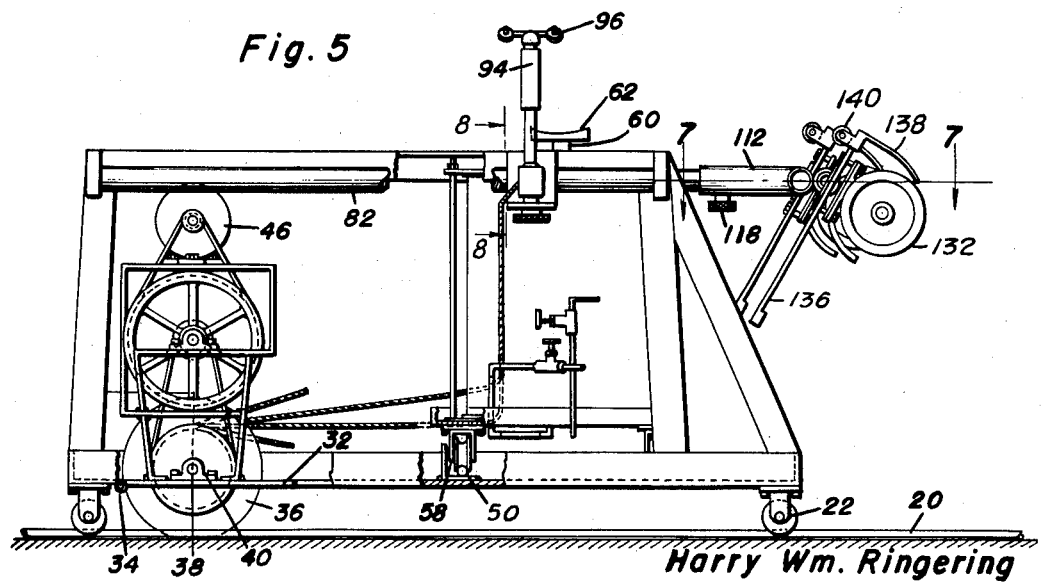
Figure 5 is a side elevation of the carriage with parts broken away and in section.
Figure 6:
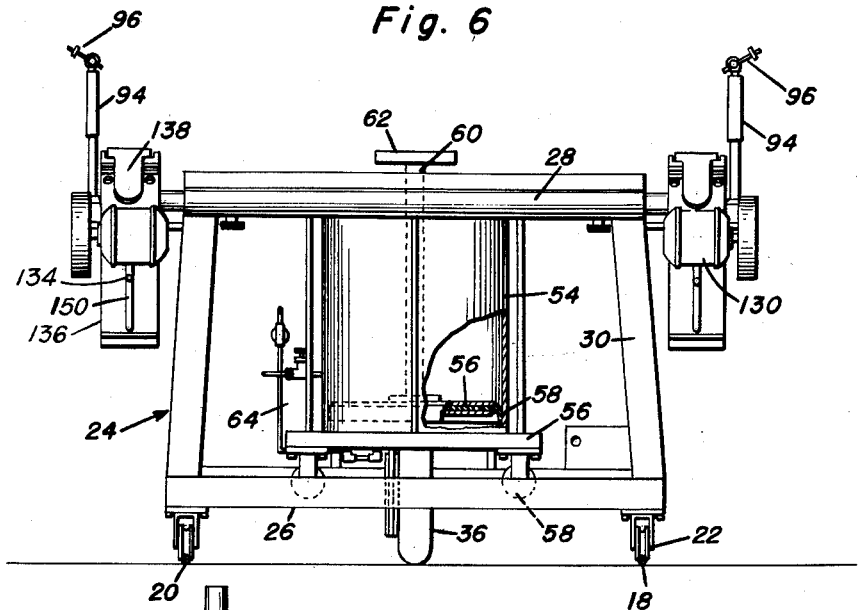
Figure 6 is a front elevation of the carriage with parts broken away and in section.
Figure 7:
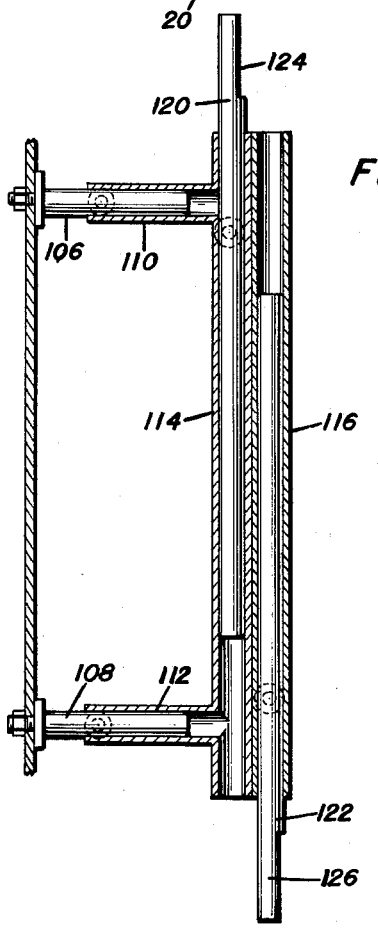
Figure 7 is a cross-section through the spinner adjusting bar taken substantially on the plane indicated by the line 7—7 of Figure 5.
Figure 8:
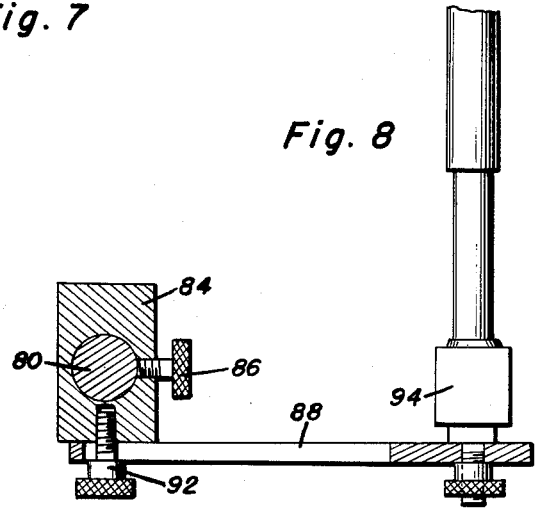
Figure 8 is a cross-section of the vibration pick-up adjustment taken substantially on the line 8—8 of Figure 5.
Figure 9:
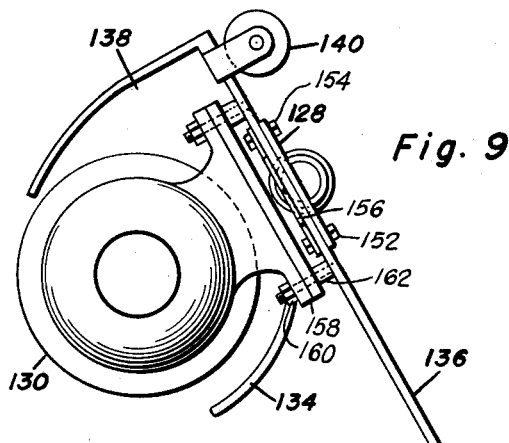
Figure 9 is an end elevation of the spinner in carrying position.
Figure 10:
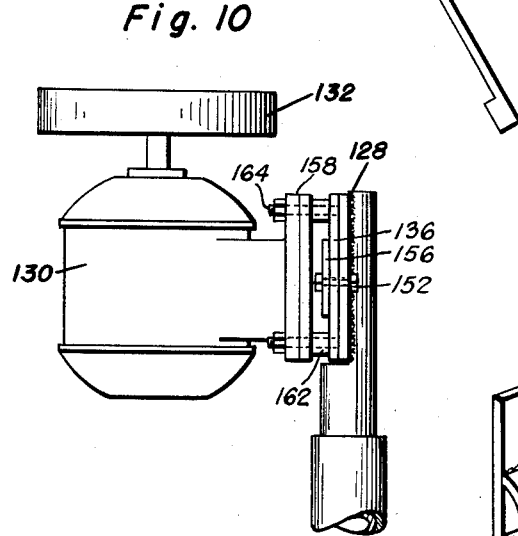
Figure 10 is a side elevation of the spinner.
Figure 11:
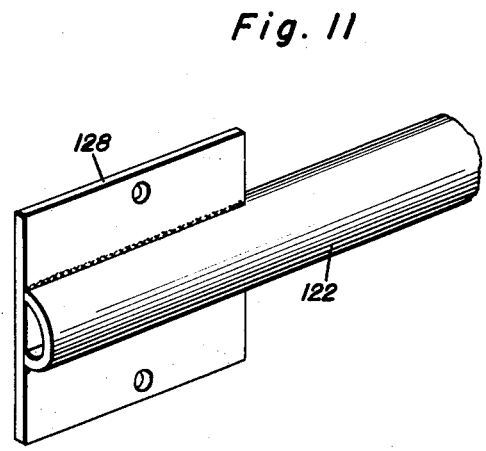
Figure 11 is a perspective view of the mounting for the spinner.

In the illustrative embodiment of the invention, a pair of runways 10 and 12 are elevated by suitable supports 14 so that the wheels 16 of any automotive vehicle may be supported on the runways 10 and 12 at a suitable height for the workmen to work on the under portions of the vehicle.

A pair of tracks 18 and 20 are mounted on the floor between the runways 10 and 12 for receiving the supporting wheels 22 of a carriage 24.

The carriage 24 is provided with a bottom rectangular framework 26 and a top framework 28. The bottom framework 26 and the top framework 28 being held in spaced relation by means of suitable struts 30.

A motor mounting bracket or platform 32 is connected to the lower framework 26 by means of suitable hinges 34. A supporting wheel 36 is secured on the axle 38 journaled in the bearings 40 which are slidably mounted in slots 42 and 44 on the platform 32. The driving motor 46 is connected in driving relation to the wheel 36 by any suitable driving connection herein illustrated as a belt and pulley multiplier system, for reducing the speed to a suitable speed for the wheel 36. The weight of the motor and the driving system is substantially supported by the wheel 36 so that the wheel 36 provides tractive effort for moving the carriage along the tracks 18 and 20.

A pair of transverse tracks 50 and 52 are mounted transversely of the lower frame 26 and a fluid cylinder 54 having a base 56 is mounted on the tracks 50 and 52 by means of suitable wheels 58.

The cylinder 54 is provided with a piston head 56 having a suitable seal 58 between the head 56 and the cylinder 54. A piston rod 60 has a lifting yoke 62 mounted on the top end thereof. Lifting fluid is supplied to the cylinder 54 by means of the tubular connection 64 which is fed by means of the flexible tube 66 which is wound on a drum 68 and is in connection with a fluid supply line 70. An electrical connection is made to the carriage 24 by means of a flexible cable 72 wound on a drum 74 having suitable connection to the supply conduit 76.

Longitudinally extending side bars 80 and 82 are mounted on the sides of the carriage 24 and extend substantially parallel to the runways 10 and 12. Mounting blocks 84 are slidably received on the side bars 80 and 82 and may be locked in position by means of set screws 86. Pick-up mounting arms 88 are slidably mounted on each of the blocks 84 by means of a longitudinal slot 90 which embraces a set screw 92 by which the arms 88 may be locked in relation to the mounting blocks 84. A vibration pick-up unit 94, preferably of the type shown in patent Serial Number 2,565,577, although any of the well known pick-up units may be used, is mounted on the end of the arm 88 and is provided with contact fingers 96 which may be brought into contact with the wheel or any other vibrating part of a motor vehicle. The stroboglow or light projector 100 is controlled by control box 102 which is in turn controlled by the vibration pick-up units 94.

Forwardly extending brackets 106 and 108 extend forwardly from the top frame 28 of the carriage and have mounted thereon sliders 110 and 112. A pair of guide tubes 114 and 116 are rigidly mounted on the sliders 110 and 112 and the sliders 110 and 112 are provided with lock screws 118 so that the sliders 110 and 112 may be locked on the brackets 106 and 108. Mounting rods or tubes 120 and 122 are slidably and rotatably mounted in guide tubes 114 and 116 and are provided with flat portions 124 and 126 on which is mounted a motor mounting plate 128. A spinner motor 130 is mounted at the outer ends of each of the tubes 120 and 122 and each of the spinner motors 130 is provided with a spinner wheel 132 which is adapted to make contact with the wheels 16 to rotate the same at high speed.

The motors 130 are provided with control handles 134 so that the motors 130 may be adjusted forwardly or transversely as may be desired to bring the spinner wheels 132 into contact with the tires of the wheels 16. The motor 130 is mounted in sliding relation to the plate 128 by means of a slotted slide bar 136. The slotted slide bar has a longitudinally extending slot 150 through which extends bolts 152 and 154 on which is fixed guide plate 156. The bolts may obviously be adjusted to control the tension applied to the guide plate 156. The motor 130 includes an enlarged base 158 through which extends stud bolts 160 for connection into the slide 136, the base 158 is spaced from the slide bar 136 by tubular spacers 162 received on the stud bolts 160 so that the motor will readily pass over the guide plate 156. A brake shoe 138 is provided at the end of the slide bar 136. The shoe 138 may be pushed into contact with the wheels 16 to quickly stop the rotary motion of the wheels after the adjustment position has been located. Rollers 140 are provided adjacent the end of the slide bar 136 for contacting with the runways 10 and 12 to assist in producing the necessary friction between the brake shoe 138 and the spinning wheel 16.

In the operation of the device according to the invention the vehicle having the wheels to be balanced is driven onto the runways 10 and 12 and the carriage 24 is positioned with the fluid cylinder 24 under either the front or back axle. The cylinder 54 may be moved either to the right or left hand side or positioned centrally of the carriage so that either the right or left hand wheel may be elevated off the runway or the entire end of the vehicle may be lifted as desired. When the front end wheels are lifted off the runway the vibration pick-up unit 94 is positioned with the pick-up fingers 96 in contact with the brake drum or other portion of the wheel to pick up any vibration therein. The slide bar 136 is utilized to rotate the bar 120 or 122 as the case may be so that the wheels 140 are rolled in the runways 10 or 12. By adjusting the slide members 110 and 112 on the brackets 106 and 108 the motor 130 will be adjusted so that the spinner wheel 132 will be in contact with the elevated wheel. The motor will then drive the wheel being adjusted at high speed and the vibration pick-up device will transmit the vibrations to the controller box 102 so that the projector 100 will be energized in direct relation to the vibration of the wheel being balanced. As is well-known a mark on the wheel being rotated will be caused to appear to stand substantially still because of the stroboscopic effect of the projector 100 so that location of the unbalance may be determined. As is well-known the vibration pick-up devices 94 are provided with switches and contacts so that either dynamic or static unbalance will be communicated to the control device 102. When one wheel has been properly balanced the jack 54 will be operated to lower the wheel onto the runway after first applying the shoe 138 to terminate the rotation thereof after which the jack will be moved to some other wheels and the operation repeated. Obviously, the carriage 24 may be traversed to either the front or back of the vehicle and when the back wheels are being balanced it is customary to start the motor of the vehicle and drive the back wheels by means of the motive power of the vehicle.

The vibration pick-up unit 94 with the fingers 96 may be applied to any other portion of the vehicle such as the drive shaft universal joint or other portion of the vehicle which may be subject to vibration so that the amount and direction of the vibration may be determined.

While a preferred embodiment of the invention has been shown, and described according to the best present understanding thereof, it will be apparent to those skilled in the art that many changes and modifications can be made therein without departing from the true spirit of the invention.

Having described the invention, what is claimed as new is:

1. A wheel balancer for use with a drive-on rack having a pair of runways comprising a carriage mounted for longitudinal movement between the runways of said rack, a motor mounting hingedly connected to said carriage, a motor mounted on said mounting, a ground engaging wheel journaled on said mounting, said wheel supporting at least a portion of the weight of said motor and said mounting, said motor being operatively connected in driving relation to said wheel, longitudinally extending side bars on said carriage, mounting blocks adjustably slidable on said side bars, laterally adjustable pick-up arms slidably adjustable on said mounting blocks, vibration pick-up units mounted on said arms, said pick up units including vibration actuated contacts.

2. A wheel balancer for use with a drive-on rack having a pair of runways comprising a carriage mounted for longitudinal movement between the runways of said rack, a motor mounting hingedly connected to said carriage, a motor mounted on said mounting, a ground engaging wheel journaled on said mounting, said wheel supporting at least a portion of the weight of said motor and said mounting, said motor being operatively connected in driving relation to said wheel, longitudinally extending side bars on said carriage, mounting blocks adjustably slidable on said side bars, laterally adjustable pick-up arms slidably adjustable on said mounting blocks, vibration pick-up units mounted on said arms, each of said pick up units including vibration actuated contacts, a strobo-light, a control for said light, and circuit means including said contacts operative to actuate said control.

3. A wheel balancer for use with a drive-on rack having a pair of runways comprising a track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms.

4. A wheel balancer for use with a drive-on rack having a pair of runways comprising a track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms, each of said pick up units including vibration actuated contacts, a stroboscopic light projector, a control circuit including said contacts in said vibration pick-up units for energizing said projector.

5. A wheel balancer for use with a drive-on rack having a pair of runways comprising a longitudinally extending track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms, each of said pick up units including vibration actuated contacts, a stroboscopic light projector, a control circuit including said contacts in said vibration pick-up units for energizing said projector, a pair of guide tubes mounted transversely of said carriage, mounting tubes slidably received in said guide tubes, a mounting plate on each of said mounting tubes, a sliding bar mounted on said mounting plate, a motor fixed on said sliding bar and a spinner wheel on said motor.

6. A wheel balancer for use with a drive-on rack having a pair of runways comprising a track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms, each of said pick up units including vibration actuated contacts, a stroboscopic light projector, a control circuit including said contacts of said vibration pick-up units for energizing said projector, a pair of guide tubes mounted transversely of said carriage, mounting tubes slidably received in said guide tubes, a mounting plate on each of said mounting tubes, a sliding bar mounted on each of said mounting plates, a motor fixed on each of said sliding bars, a spinner wheel operatively mounted on said motor, a control handle on said sliding bar for adjusting said spinning wheel into and out of contact with a wheel to be balanced.

7. A wheel balancer for use with a drive-on rack having a pair of runways comprising a track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms, each of said pick-up units including vibration actuated contacts, a stroboscopic light projector, a control circuit including said contacts of said vibration pick-up units for energizing said projector, a pair of parallel transverse tubular guideways adjustably mounted on said carriage, mounting tubes slidably and rotatably received in said guideways, a motor mount slidably mounted on each of said mounting tubes, a motor fixed on each of said mounts, a spinner wheel driven by each of said motors.

8. A wheel balancer for use with a drive-on rack having a pair of runways comprising a track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms, a stroboscopic light projector, a control circuit including said vibration pick-up units for energizing said projector, a pair of parallel transverse tubular guideways adjustably mounted on said carriage, mounting tubes slidably and rotatably received in said guideways, a slotted bar slidably mounted on each of said mounting tubes, a motor fixed on each of said slotted bars, a spinner wheel driven by each of said motors, a brake shoe mounted on each said slotted bar.

9. A wheel balancer for use with a drive-on rack having a pair of runways comprising a track fixed between the rack runways, a carriage mounted on said track, a motor platform hingedly attached to said carriage, a ground engaging wheel journaled on said platform, a driving connection between said motor and said wheel, a transverse track on said carriage, a fluid operated jack mounted on said transverse track, side bars on said carriage extending in substantially parallel relation to said runways, mounting blocks slidably mounted on said bars, a pick-up unit mounting arm slidably mounted on each of said mounting blocks, a vibration pick-up unit mounted on each of said arms, a stroboscopic light projector, a connection including said vibration pick-up units for energizing said projector, a pair of parallel transverse tubular guideways adjustably mounted on said carriage, mounting tubes slidably and rotatably received in said guideways, a plate fixed adjacent the outer end of each of said mounting tubes, a slotted bar slidable on each of said plates, a motor fixed on each of said slotted bars, a spinner wheel driven by each of said motors, a brake shoe mounted on each said slotted bar, rollers mounted on said bar for contact with the runways.

References Cited in the file of this patent

UNITED STATES PATENTS

| | | |
|---|---|---|
| 680,074 | Pullen | Aug. 6, 1901 |
| 2,053,080 | Henricks | Sept. 1, 1936 |
| 2,327,446 | Ortgies | Aug. 24, 1943 |
| 2,341,443 | Hunter, Jr. | Feb. 8, 1944 |
| 2,341,444 | Hunter, Jr. | Feb. 8, 1944 |
| 2,495,573 | Duke | Jan. 24, 1950 |
| 2,565,577 | Schnoebelen | Aug. 28, 1951 |
| 2,604,558 | Hermann | July 22, 1952 |